UNITED STATES PATENT OFFICE.

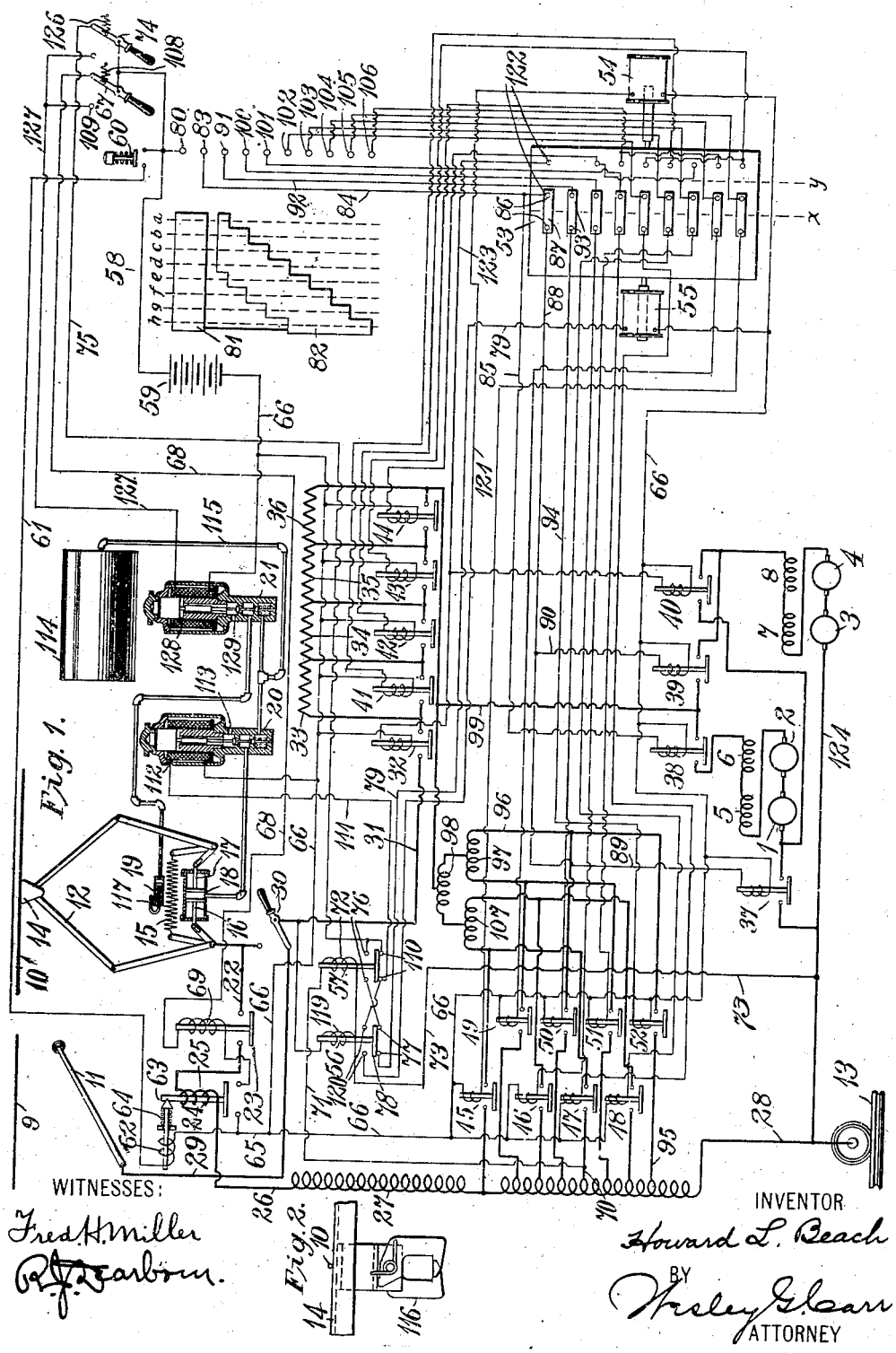

HOWARD L. BEACH, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRIC-MOTOR CONTROL.

No. 929,186.     Specification of Letters Patent.     Patented July 27, 1909.

Application filed September 26, 1907. Serial No. 394,746.

*To all whom it may concern:*

Be it known that I, HOWARD L. BEACH, a citizen of the United States, and a resident of Wilkinsburg, in the county of Allegheny and State of Pennsylvania, have invented a new and useful Improvement in Systems of Electric-Motor-Control, of which the following is a specification.

My invention relates to systems of electric motor control, and has special reference to the control of electric vehicle motors which are adapted to receive energy from either direct or alternating current sources.

The object of my invention is to provide a system of the class above indicated that shall be simple in arrangement and effective in operation and that shall embody automatic means for rendering the apparatus on the vehicle electrically dead in order to protect passengers and attendants from injury in case the vehicle leaves the rail or the return circuit is interrupted for other reasons.

When electric vehicles are supplied with energy from sources of alternating current, the trolley voltage is often relatively high, a suitable transformer being mounted on the vehicle in order that energy may be supplied to the motors at a suitable low voltage. The control of such systems is effected by varying the motor connections from one transformer tap to another, and it will be readily understood that the transformer windings are continually energized from the supply circuit as long as the alternating current trolley or other current-collecting device is in engagement with its supply conductor, and as long as the vehicle wheels rest upon the rails which usually constitute one leg of the circuit.

According to my present invention, I provide an improved system having two current-collecting devices which are respectively adapted for direct and alternating current. One of these collectors is pneumatically operated and the arrangement of the system is such that a change from direct to alternating or alternating to direct current may be effected while the vehicle is in motion with a minimum amount of labor and trouble. In a system of vehicle control having a transformer connected as above indicated, passengers and attendants would be in great danger of injury should the vehicle be derailed while the alternating current collector was still in engagement with the supply conductor, one terminal of the transformer being normally grounded or connected to a return circuit conductor through the vehicle wheels. I have obviated this difficulty by providing means dependent upon the interruption of the transformer circuit for automatically lowering the alternating current collector.

Figure 1 of the accompanying drawings is a diagrammatic view of a system arranged in accordance with my invention, and Fig. 2 is a sectional view of the alternating current collector shown in Fig. 1.

Referring to the drawings, a plurality of electric motors having armatures 1, 2, 3 and 4 and field magnet windings 5, 6, 7 and 8 may be supplied with energy from direct or alternating current sources through trolley conductors 9 and 10 and trolleys 11 and 12, circuit being completed through a rail conductor 13. The direct current trolley 11 is controlled manually, but the alternating current trolley 12 is of the pantograph type, comprises a contact shoe 14, a spring 15 which normally holds the shoe in engagement with a trolley conductor, lowering pistons 16 and 17 that operate in a cylinder 18 and a latch 19, and is governed by electromagnet valves 20 and 21.

Alternating current energy is supplied directly from the trolley 12 through conductor 22, line switch 23, magnet winding 24 of a relay switch 25 and conductor 26 to one terminal of a transformer 27, the opposite terminal of the transformer being connected to the rail conductor 13 by a conductor 28.

Energy is supplied from the direct current trolley 11 through a conductor 29, switch 30, conductor 31 and line switch 32 to one terminal of a resistance comprising sections 33, 34, 35 and 36. Motors 1 and 2 are permanently connected together electrically and the motors 3 and 4 are similarly connected so that each group may be considered as a single motor and the circuit connections of the groups may be varied from a series to a parallel relation and may be connected or disconnected from a line by a plurality of independently-operated switches 37, 38, 39 and 40. The amount of resistance included in the circuit may be varied by a series of switches 41, 42, 43 and 44 and the alternating current voltage applied to the motors is governed by a group of independently-operated switches 45 to 52, inclusive.

A change-over switch 53, which is operated selectively by electro-magnets 54 and 55, is adapted to arrange the control circuits for operating the system from alternating or direct current, and the position of the switch is determined by selective relays 56 and 57.

The independently-operated switches and the line switches which are referred to above are each provided with an operating electro-magnet and are governed by a master controller 58, energy being supplied for the control switches from a storage battery 59.

The operation of, and the circuit connections for, the system are as follows: Assuming that the alternating current trolley 12 engages its supply conductor 10, and that the various switches of the system occupy positions as shown in the drawing, line switches 23 and 32 being open, the motors may be accelerated by first closing a re-set switch 60 and by moving the master controller 58 so that it will occupy positions $a$, $b$, $c$, $d$, $e$, $f$, $g$ and $h$, successively. As soon as switch 60 is closed, a control circuit is established from the storage battery 59 through this switch, conductor 61, magnet winding 62, conductor 65, and negative conductor 66 to the opposite terminal of the battery. The magnet winding 62, when energized, releases a latch 63 which is operated by a spring 64 and effects the closure of the switch 25, which completes a control circuit from the battery through a switch 67, a conductor 68, an operating magnet winding 69 of the line switch 23, switch 25 and conductor 65 to the negative conductor 66. As soon as the line switch 23 is closed, following the energizing of magnet winding 69, a main circuit is established from alternating current supply conductor 10 through the trolley 12, conductor 22, line switch 23, overload release coil 24 of the switch 25 and conductor 26 to one terminal of the auto-transformer 27, the opposite terminal of the transformer being connected to the rail conductor 13 by a conductor 28. The holding circuit of the line switch 23 is maintained through the switch 25, except under overload conditions, the alternating current circuit being normally made and interrupted by the engagement or disengagement of the trolley with the supply line conductor.

When the transformer 27 is energized, as above indicated, current is supplied from a low-voltage tap 70 through a conductor 71 to a magnet winding 72, from which point the circuit is completed through conductor 73 to return circuit conductor 13. When energized, the magnet winding 72 raises the switch 57, and a circuit is then completed from the battery 59 through a switch 74, conductor 75, contact fingers 76 of the switch 57, contact members 77 (which are bridged by the contact member 78 of the switch 56) and conductor 79 to magnet winding 55 of the change-over switch 53, circuit being completed from this point through the negative conductor 66. The change-over switch is moved to occupy position $x$ by the energizing of this magnet winding, and the motors may be supplied with alternating current energy. If the master controller 58 is now moved to occupy position $a$, energy is supplied from the storage battery 59 through contact finger 80 to contact members 81 and 82, circuit being continued from contact finger 81 through contact finger 83, conductor 84, and conductor 85 to magnet winding of the switch 38, the opposite terminal of this winding being connected to negative conductor 66. A second circuit is established from the conductor 84, through contact fingers 86 (that are bridged by a contact member 87 when the change-over switch 83 occupies position $x$), to conductor 88, the circuit being divided from this point so that energy is supplied through conductors 89 and 90 to the magnet windings of switches 37 and 39. The contact member 82 is engaged by a contact finger 91 and energy is supplied from this finger through conductor 92, contact fingers 93, and conductor 94 to the magnet winding of the switch 52, the circuit being completed as before through the negative conductor 66. In this way, the switches 38, 39, 37 and 52 are closed and alternating current energy is supplied from a low-voltage tap 95 of the transformer 27, through switch 52, conductor 96, preventive coils 97 and 98, conductor 99 to the switches 38 and 39, two branch circuits being completed from this point to the negative rail conductor 13, one of them being established through switch 38, field magnet windings 6 and 5, motor armatures 2 and 1 and switch 37, and the other being established through switch 39, field magnet windings 8 and 7, motor armatures 4 and 3. If the master controller is moved to successively occupy positions $b$, $c$, $d$, $e$, $f$, $g$ and $h$, switches 48, 51, 47, 50, 46, 49 and 45 are successively closed, circuits being established through contact fingers 100, 101, 102, 103, 104, 105 and 106 which move successively into engagement with the contact member 82.

It will be observed that switches 52, 48, 51 and 47 are all closed at one time and then as the switch 50 is closed the switch 52 is permitted to open, and as the switch 46 is closed, the switch 48 opens, and so on, four of the switches being closed at one time. The voltage variations are accomplished without at any time interrupting the circuit or directly short-circuiting any of the transformer turns by the use of three preventive coils 97, 98 and 107 which are manipulated as illustrated and described in Patent No. 834,525, granted October 30, 1906, to the Westinghouse Electric & Manufacturing Company, as assignee of Ray P. Jackson.

If it is desired to render the apparatus on the vehicle electrically dead, the switch 67 may be moved temporarily in opposition to a spring 108 into contact with a finger 109, thereby interrupting the circuit which was formerly established through the magnet winding 69 of the line switch 23. The magnet winding 72 is deënergized, since energy is cut off from the transformer, consequently, the switch 57 drops to its lower position and a circuit is then established from a conductor 75 through contact fingers 110 and conductor 111 to magnet winding 112 of the magnet valve 20. When energized, this magnet valve closes an exhaust port 113 and admits fluid-pressure from a storage reservoir 114 through a pipe 115 to cylinder 18 between the pistons 16 and 17 which are immediately separated, thereby lowering the contact shoe 14 in opposition to the spring 15. The contact shoe 14 is provided with a spring catch 116, as shown in Fig. 2 of the drawings, and engages a hook projection 117 from the latch 19. The same lowering action of the trolley may be effected automatically when the trolley circuit is interrupted by the separation of the car wheels from the rails, in case of accident, or by the normal passing of the trolley shoe onto a dead section for the purpose of changing from alternating to direct current operation.

Assuming that the alternating current trolley 12 is lowered and that the master controller 58 is in its "off" position, if the direct current trolley 11 is now moved into engagement with a direct current supply conductor 9, energy is first supplied through a conductor 29 and switch 30 to magnet winding 119 of the relay switch 56, circuit being completed to rail conductor through the conductor 73. The relay switch is raised following the energizing of its winding, and a control circuit is completed from the storage battery 59, through switch 74, conductor 75, contact fingers 110 of the switch 57, contact fingers 120 (that are engaged by contact members 78) and conductor 121 to operating magnet 54 of the change-over switch 53, which is then moved to position y. If the master controller is again moved to occupy the position a, energy is supplied to conductors 84 and 92, one circuit being completed from conductor 84 to the magnet winding of the switch 38, a second being completed from a conductor 84 through the contact fingers 122 (which are bridged by the contact member 87) and conductor 123 to the magnet windings of line switch 32 and switch 40, circuit being completed in each instance through the negative conductor 66. As soon as line switch 32 and line switches 38 and 40 are closed, as above indicated, a motor circuit is established from the direct current trolley 11 through conductor 29, switch 30, conductor 31, line switch 32, resistance sections 33, 34, 35 and 36, conductor 99, switch 38, field magnet windings 6 and 5, motor armatures 2 and 1, switch 40, field magnet windings 8 and 7, motor armatures 4 and 3, and conductor 124 to the negative rail conductor 13. The motors are thus connected in a single series circuit, and as the master controller 58 successively occupies its remaining positions, the resistance sections which are at first included in the circuit are short-circuited by switches 41, 42, 43 and 44 which are dependent upon engagement of fingers 103, 104, 105 and 106 with contact member 82.

In changing from direct current to alternating current, a dead section of conductor is usually provided in which the vehicle driver should move his master controller to the "off" position and the vehicle driver or other attendant should pull down the direct current trolley. The alternating trolley 12 may then be raised into engagement with the conductor by moving the switch 74 in opposition to a spring 126 so that a circuit may be temporarily completed through a conductor 127 to magnet winding 128 of the valve magnet 21. When energized, this magnet valve closes an exhaust port 129 and admits fluid-pressure from the pipe 115 to the latch cylinder 19. The hook projection 117 is thereby released from the spring hook 116 and the trolley is raised by the spring 15 into engagement with the conductor. In passing from alternating to direct current, the alternating current trolley 12 will be automatically separated from the conductor, as hereinbefore set forth, and it is then necessary for the attendant to manually raise the direct current trolley into engagement with the conductor.

It will be observed that the change-over switch 53 may not be actuated if the relay switches 56 and 57 are both closed at one time, since the circuit is established when one switch is closed and is also dependent upon the other switch being open.

It will be understood that variations in the circuit connections shown in the drawings may be effected within the scope of my invention, and I desire that only such limitations be imposed as are indicated in the appended claims.

I claim as my invention:

1. In a system of electric vehicle control, the combination with a supply conductor, a transformer, and a current-collecting device that engages the conductor and is electrically connected to the transformer, of means dependent upon predetermined conditions in the transformer circuit for automatically moving the current-collecting device out of engagement with the supply conductor.

2. In a control system for electric vehicles, the combination with an electric motor, a supply circuit, a transformer, and a current-collecting device connecting one extremity of the transformer with a supply circuit, of means dependent upon the interruption of the circuit in which the transformer is included for automatically effecting the separation of the current-collecting device from the supply circuit.

3. In a system of electric vehicle control, the combination with a supply conductor, a return circuit conductor, a transformer interposed between the two conductors, and a current-collecting device which connects one end of the transformer with a supply conductor, electric driving motors that are energized from intermediate taps in the transformer, of means dependent upon the interruption of the circuit in which the transformer is connected for automatically separating the current-collecting device from the supply conductor.

4. In a system of electric vehicle control, the combination with a supply conductor, a return conductor, a transformer normally interposed between the two, a trolley connecting one extremity of the transformer to the supply conductor, and driving motors that are energized from the transformer, of a relay switch that is energized from an intermediate point in the transformer and is adapted to automatically effect the separation of the trolley from the supply conductor when deënergized.

5. In a system of electric vehicle control, the combination with a supply conductor, a return circuit conductor, a transformer normally interposed between the two, a trolley connecting one extremity of the transformer to the supply conductor, resilient means for maintaining the engagement of these parts, and means responsive to fluid-pressure for opposing the spring and lowering the trolley, and motors energized from intermediate points in the transformer, of a relay switch having an operating magnet winding that is energized directly from a tap in the transformer, said relay switch being adapted to energize said fluid-pressure-responsive means when its magnet winding is deënergized.

6. In a system of electric vehicle control, the combination with a supply conductor, a return circuit conductor, a transformer normally interposed between the two, a trolley connecting one extremity of the transformer to the supply conductor, a spring for holding the trolley in engagement with the conductor, a fluid-pressure cylinder and pistons operating therein to act in opposition to the spring, and motors that are energized from intermediate taps in the transformer, of an electro-responsive valve that controls the admission of fluid-pressure through the cylinder, and a relay switch having a magnet winding that is energized directly from a transformer tap, said switch being adapted, when open, to energize the electro-responsive valve, thereby admitting fluid-pressure to the cylinder and lowering the trolley.

7. In a system of electric vehicle control, the combination with alternating and direct current supply conductors, current-collecting devices adapted for engagement with each supply conductor, a return circuit conductor, a transformer interposed between the alternating current collector and the return circuit conductor, and electric driving motors that may be supplied with energy from either conductor, of a change-over switch for effecting the proper circuit connections, and a relay switch having a magnet winding that is energized from the transformer and is adapted, when energized, to move the change-over switch to a predetermined position, and when deënergized to effect the separation of the alternating current collector from its supply conductor.

8. In a system of electric vehicle control, the combination with a supply circuit conductor, a transformer and a current-collecting device that engages the conductor and is electrically connected to the transformer, of means dependent upon the interruption of the transformer circuit for rendering the transformer electrically dead.

9. In a system of electric vehicle control, the combination with a supply circuit conductor, an electric current-receiving device on the vehicle, and a current-collecting device that engages the conductor and is connected to the receiving device, of means dependent upon the interruption of the circuit of the receiving device for automatically interrupting the connection between the receiving device and the current collector.

10. In a system of electric vehicle control, the combination with a supply circuit conductor, a transformer and a current-collector engaging the conductor and connected to the transformer, of means dependent upon a predetermined current traversing the connection between the collector and the transformer for automatically separating the collector from the supply circuit conductor.

11. In a system of electric vehicle control, the combination with a supply circuit conductor, current-receiving apparatus on the vehicle, and a current-collector engaging the supply circuit conductor and connected to the receiving apparatus, of means dependent upon an excessive current traversing the connection between the collector and the current-receiving apparatus for automatically separating the collector from the supply conductor.

12. In a system of electric vehicle control, the combination with a supply circuit conductor, propelling motors on the vehicle and a trolley engaging the conductor and connected to the motors, of automatic means dependent upon an excessive current supplied to the motors for moving the trolley out of engagement with the conductor.

13. In a system of electric vehicle control, the combination with a supply circuit conductor, a receiving circuit conductor on the vehicle and a current-collector engaging the supply circuit conductor and connected to the receiving circuit conductor, of automatic means dependent upon predetermined current conditions in the receiving circuit conductor for moving the collector out of engagement with the supply circuit conductor.

In testimony whereof, I have hereunto subscribed my name this 24th day of Sept., 1907.

HOWARD L. BEACH.

Witnesses:
 HERMAN E. KRENDER,
 BIRNEY HINES.